United States Patent

Kovar

[15] 3,637,027
[45] Jan. 25, 1972

[54] HYDRAULICALLY FOLDABLE SOIL CONDITIONER

[72] Inventor: Henry L. Kovar, Osseo, Minn.
[73] Assignee: John R. Kovar Mfg. Co., Inc., Anoka, Minn.
[22] Filed: Aug. 19, 1970
[21] Appl. No.: 65,033

[52] U.S. Cl. .............................172/311, 172/456, 280/412
[51] Int. Cl. ...............A01b 49/00, A01b 63/32, A01b 65/04
[58] Field of Search..........172/619, 630, 631, 640, 634–637, 172/668, 451, 448–449, 459, 397, 310–311, 456, 446; 280/411–413

[56] References Cited

UNITED STATES PATENTS

| 3,373,822 | 3/1968 | Hornung | 172/311 |
| 3,428,333 | 2/1969 | Nelson | 172/456 |
| 3,536,144 | 10/1970 | Hood et al. | 172/311 |
| 3,548,954 | 12/1970 | Lindemann | 172/311 |
| 3,568,777 | 3/1971 | Hook | 172/456 |

Primary Examiner—Robert E. Pulfrey
Assistant Examiner—C. W. Hanor
Attorney—Zarley, McKee & Thomte

[57] ABSTRACT

A foldable soil conditioner includes a main frame and a wing frame hinged adjacent the rearward end of the main frame. The wing frame includes a central member having two wing members hinged to its opposite ends. A pair of reinforcing chains interconnect the wing members with a forward portion of the main frame. A hydraulically operated linkage is adapted to swing the wing frame about its hinged connection with the main frame from an operable position wherein the hinged axes of the wing members are horizontal to an intermediate position wherein the hinged axes of the wing members are vertical. A takeup device is mounted on the main frame and includes swingable arms connected to the reinforcing chains so as to swing and lift them upwardly to take up any slack therein. A pair of levers is hinged to the main frame and is connected to the swingable arms for swinging them. A hydraulically operated mechanism interconnects both of the wing members and the central member and is adapted to swing the wing members towards the lateral sides of the main frame. This mechanism includes links which engage the aforementioned levers when the wing frame is in its intermediate position. When the mechanism is actuated it causes the wing members to fold and simultaneously causes the swingable arms to take up the slack in the reinforcing chains.

20 Claims, 11 Drawing Figures

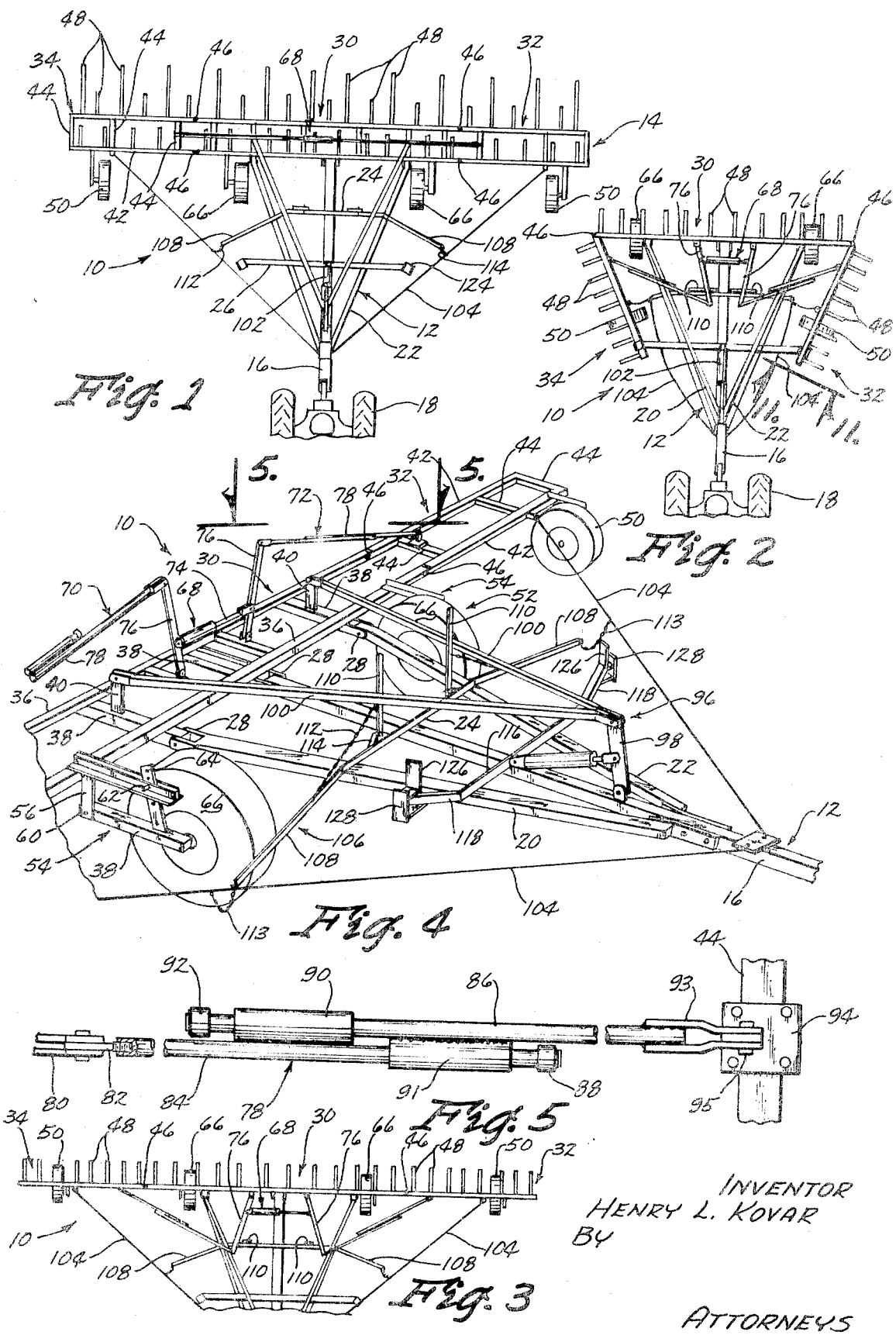

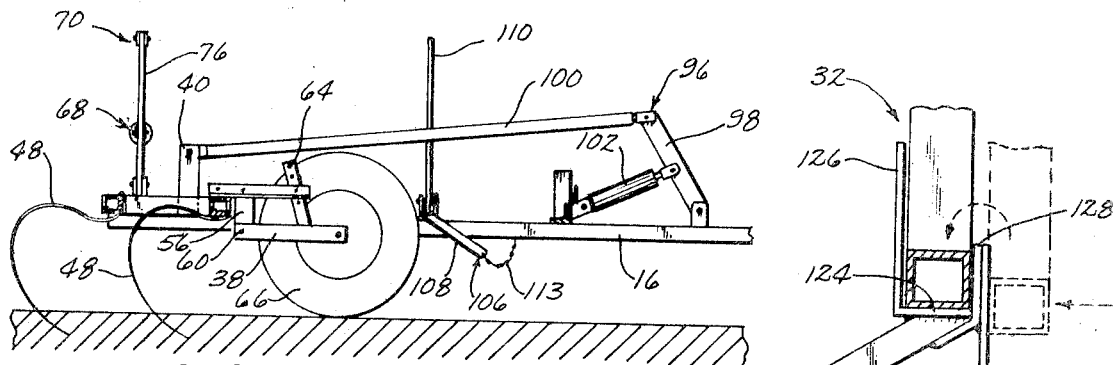
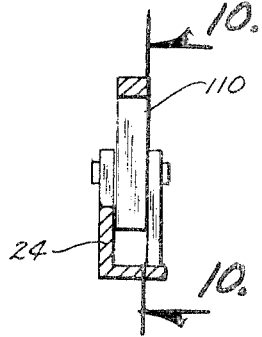
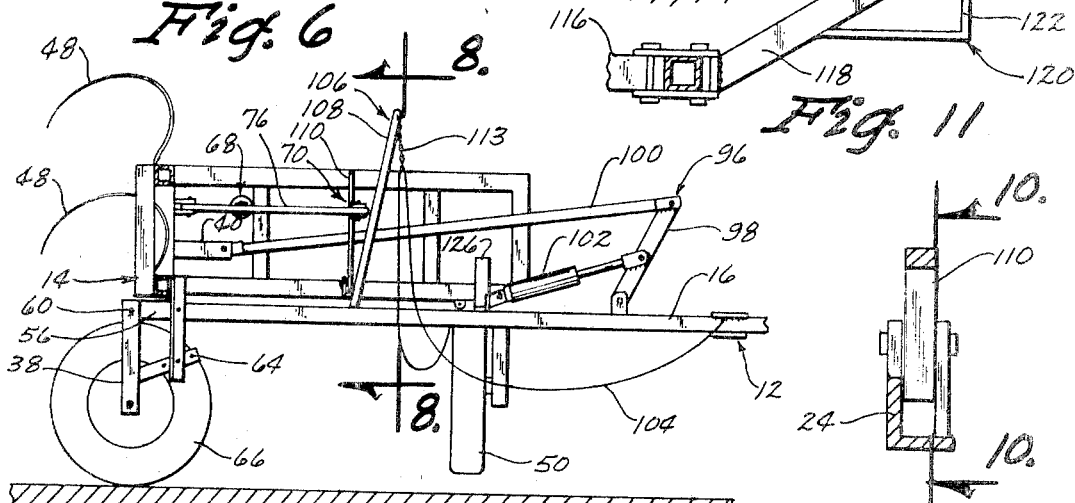
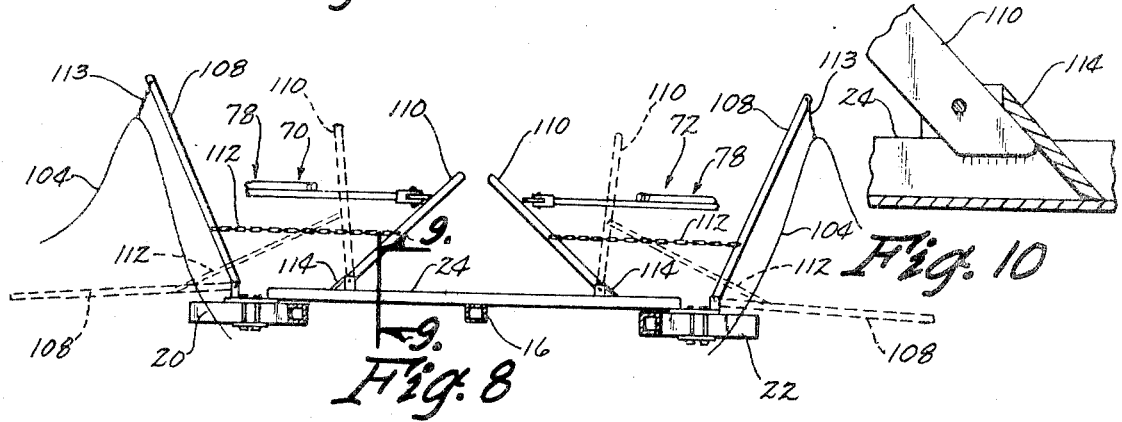
INVENTOR
HENRY L. KOVAR

HYDRAULICALLY FOLDABLE SOIL CONDITIONER

This invention relates to farm implements and more particularly to a foldable soil conditioner adapted to be automatically folded for transport without requiring the operator to dismount from the pulling vehicle.

Previous foldable soil conditioners have heretofore included only manual means for folding them so that they can be transported from one field to another. In many of these devices the reinforcing rod must be removed in order to permit the folding of the wing members. These presently known devices are an inconvenience because they require the operator of the vehicle to dismount from the vehicle in order to fold them for transporting.

The present invention provides a fully automatic folding soil conditioner which can be folded from the tractor or pulling vehicle itself without requiring the operator to dismount from the vehicle. The folding mechanism includes means for taking up the slack in reinforcing chains as the wing members are folded so that the chains do not drag on the ground.

Therefore, a principal object of the present invention is the provision of a soil conditioner which can be automatically folded and unfolded without requiring the tractor operator to dismount from the tractor;

A further object of the present invention is the provision of a soil conditioner which can be completely folded and unfolded by means of no more than two hydraulic cylinders;

A further object of the present invention is the provision of a soil conditioner which has foldable wing members extending outwardly from its lateral sides, the wing members being capable of limited vertical movement so as to permit them to ride easily on varying landscape contours;

A further object of the present invention is the provision of a foldable soil conditioner which includes means for folding which can be easily incorporated into presently existing soil conditioners;

A further object of the present invention is the provision of a foldable soil conditioner which includes means for folding its wing members and for simultaneously causing the slack to be taken up in the diagonal reinforcing cables or chains which interconnect the wing members and the forward part of the main frame of the soil conditioner;

A further object of the present invention is the provision of a foldable soil conditioner which includes means interconnecting the two wing members so that lowering of one wing member during operation of the soil conditioner will cause raising of the other wing member; and A further object of the present invention is the provision of a foldable soil conditioner which is economical to manufacture, simple in construction, and durable in use.

These and other objects will be apparent to those skilled in the art.

My invention consists in the construction, arrangements, and combination of the various parts of the device, wherein the objects contemplated are attained as hereinafter more fully set forth, specifically pointed out in my claims, and illustrated in the accompanying drawings, in which:

FIG. 1 is a top view of the foldable soil conditioner of the present invention;

FIG. 2 is a top view similar to that of FIG. 1 showing the wing frame in its intermediate position;

FIG. 3 is a top view similar to FIGS. 1 and 2 showing the wing frame in its intermediate position;

FIG. 4 is a perspective view of the foldable soil conditioner of the present invention;

FIG. 5 is a detailed view of the extendable links interconnecting the central frame member with the wing members of the link frame as seen along line 5—5 of FIG. 4;

FIG. 6 is a side-elevational view of the foldable soil conditioner;

FIG. 7 is a side-elevational view similar to that of FIG. 6 showing the wing frame in its transport position;

FIG. 8 is a sectional view taken along line 8—8 of FIG. 7;

FIG. 9 is a sectional view taken along line 9—9 of FIG. 8;

FIG. 10 is a sectional view taken along line 10—10 of FIG. 9; and

FIG. 11 is a sectional view taken along line 11—11 of FIG. 2.

Referring to the drawings a foldable soil conditioner 10 includes a main frame 12 and a wing frame 14. Main frame 12 includes a tongue 16 which is adapted to be detachably secured to a pulling vehicle 18. Rigidly secured to tongue 16 adjacent its forward end are two side members 20, 22 which extend rearwardly therefrom and diverge outwardly therefrom. Extending transversely across tongue 16 and side members 20, 22 and rigidly secured thereto are a takeup crossbar 24 and a bumper crossbar 26. Wing frame 14 is hinged to the rearwards ends of tongue 16 and side members 20, 22 by means of hinges 28, and includes a central member 30 having a wing member 32 hinged to one of its ends and a wing member 34 hinged to the opposite of its ends. Central member 30 includes a pair of spaced side members 36 which extend transversely across the rearward end of main frame 12, and three crossmembers 38 which extend between side members 36 and are pivotally connected at their forward ends to main frame 12 by means of hinges 28. A pair of spaced upstanding stubs 40 are weldably secured to the upper surfaces to two crossbars 38. Wing members 32, 34 also include a pair of spaced side members 42 which are joined by a plurality of crossbars 44. The hinged connections between the opposite ends of central member 30 and wing members 32, 34, are provided by hinges 46. Secured to wing frame 14 and extending downwardly therefrom are a plurality of soil-conditioning members 48. Wing frame 14 is adapted to swing about hinges 28 from an operable position shown in FIGS. 1, 4, and 6 to an intermediate position shown in FIG. 3. In its operable position wing frame 14 holds soil-conditioning members 48 a predetermined distance below main frame 12 and in its intermediate position wing frame 14 holds soil-conditioning members 48 in an elevated position with respect to main frame 12 (FIG. 7). Furthermore, the pivotal axes of wing members 32, 34 about hinges 46 are moved from a horizontal position when wing frame 14 is in its operable position to a vertically disposed position when wing frame 14 is in its intermediate position.

A pair of wing wheel assemblies 50 are mounted to wing members 32, 34 adjacent their outermost ends, and are adapted to rotatably support wing members 32, 34. Rigidly secured to central member 30 are a pair of central member wheel assemblies 52 which are mounted thereon by means of wheel carriages 54. Each wheel carriage 54 includes an L-shaped bracket 56 rigidly secured to central member 30 and a cooperating L-shaped bracket 58 which is pivoted by means of a pin 60 to one leg of bracket 56 and which is pinned to the other leg of bracket 56 by means of a pin 62. A plurality of apertures 64 are provided in one leg of bracket 58 so as to permit adjustable securing of bracket 58 to bracket 56 by means of pin 62. A pair of wheels 66 are mounted on each of wheel carriages 54 at a point spaced forwardly from the pivotal axes of hinges 28 so that swinging movement of wing frame 14 about hinges 28 causes wheel assemblies 52 to be swung under wing frame 14 and to lift wing frame 14 a short distance above the ground. Thus movement of wing member 14 to its intermediate position causes it to be lifted by wheel assemblies 52, as can be seen by comparing the positions of wheel assemblies 52 in FIGS. 6 and 7.

A mechanism 68 pivotally interconnects central member 30 and wing members 32, 34 so as to cause folding movement of wing members 32, 34 with respect to central member 30. Mechanism 68 includes a pair of linkages 70, 72 which interconnect central member 30 with wing members 32, 34, and which are interconnected to one another by means of a hydraulic cylinder 74. Each of linkages 70, 72, includes a first link 76 hinged at its lower end to central member 30 and a second extensible link 78 hinged at its lower end to one of wing members 32, 34. Each first link 76 includes a hinge 80 on its upper end having a threaded bolt 82 swingably extending therefrom (FIG. 5). Threaded bolt 82 is threadably secured within the upper end of extensible link 78 so as to permit adjustment of the distance between the upper end of first line 76 and the hinged connection of extensible link 78 to one of wing members 32, 34. Each extensible link 78 includes two extensible members 84, 86. Extensible member 84 is threaded at its upper end to bolt 82 and includes at its opposite end a stop 88. Intermediate its ends extensible member 84 includes a sleeve 90 slidably extending over extensible member 86. Similarly extensible member 86 includes a sleeve 91 which slidably fits over extensible member 84. Extensible member 86 also includes a stop 92 at its upper end for limiting the sliding movement of sleeve 90 thereon. Member 86 also includes a hinge clevis 93 at its lower end adapted to be hinged to a hinge bracket 94 on a removable plate 95 detachably mounted on one of crossbars 44 on wing members 32, 34. Hinge bracket 94 is off center with respect to removable plate 95 so that a 180° rotation of removal plate 95 will cause the position of hinge bracket 94 to be altered with respect to crossbar 44. Sleeves 90, 91 permit extensible members 84, 86 to extend and retract with respect to each other, and stops 88, 92 limit this extensible movement. Hydraulic cylinder 74 is connected at one of its ends to first link 76 of linkage 70 and at the other of its ends to first link 76 of linkage 72. A plurality of holes may be provided along the lengths of first links 76 so as to permit the variation of the distance of hydraulic cylinder 74 above the pivotal axes of links 76 with respect to central member 30. Cylinder 74 ties linkages 70, 72 together thereby causing swinging movement of wing member 32 to be transferred to wing member 34 and vice versa. However, the extensible nature of extensible links 78 permits slight vertical movement of wing members 32, 34 without causing this movement to be transferred to the wing member on the opposite side of the device. Therefore, wheel assemblies 50 may ride freely up and down as the contour of the landscape varies.

When hydraulic cylinder 68 contracts it causes wing members 32, 34 to swing from their extended positions (FIGS. 1, 3 and 4) to their folded positions (FIG. 2) wherein they are folded inwardly toward the lateral sides of main frame 12. This retraction of cylinder 74 also causes first links 76 to move from a first position as shown in FIG. 4 wherein they diverge upwardly and outwardly with respect to one another to a second position as shown in FIG. 2 wherein their free ends converge toward one another. When wing members 32 are in their folded positions, wing frame 14 is in a transport position wherein it can be transported from field to field.

A power means 96 is provided for swinging wing frame 14 from its operable position to its intermediate position. Power means 96 includes a first link 98 pivotally connected to tongue 16 and extending upwardly therefrom. Pivotally secured to the upper end of first link 98 are a pair of second links 100 which extend rearwardly and diverge towards their rearward ends where they are pivotally secured to upstanding stubs 40 on central member 30. A hydraulic cylinder 102 is pivotally secured at one of its ends to first link 98 and at the other of its ends to main frame 12 so that upon extension and retraction thereof it will cause first link 98 to swing and consequently will cause second links 100 to move wing frame 14 between its operable and intermediate positions.

A pair of reinforcing members 104 are each secured at one of their ends to one of wing members 32, 34 and extend forwardly therefrom to the other of their ends which is secured to the forward end of main frame 12. Reinforcing members 104 may be chains, cables, or jointed rods having swivels intermediate their ends. In previous devices reinforcing members 104 were elongated rods which were not foldable intermediate their ends. Consequently, when it was desired to fold wing members 32, 34 it was necessary to remove reinforcing members 104 prior to the folding movement. In the present invention, however, reinforcing members 104 are swiveled at at least one point intermediate their ends so that they will fold in response to the folding movement of wing members 32, 34.

A takeup means 106 is mounted on takeup crossbar 24 and includes a pair of swinging arms 108 and a pair of upstanding levers 110 which are interconnected by means of connecting chains 112. Arms 108 are pivotally secured at one of their ends to the opposite ends of crossbar 24 and are adapted to swing with respect thereto so that their outer ends are adjacent reinforcing members 104. Interconnecting the outer ends of arms 108 to reinforcing members 104 are a pair of chains 113. Levers 110 are hinged at their lower ends to crossbar 24 for swinging movement toward and away from one another. A stop member 114 (FIG. 10) is provided on crossbar 24 for limiting the swinging movement of levers 110 at a point wherein they are vertically disposed. As levers 110 swing toward one another they cause connecting chains 112 to lift swing arms 108 upwardly thereby lifting reinforcing members 104 upwardly and taking any slack out of reinforcing members 104. Because stop members 114 limit the swinging movement of levers 110 in an outward direction they also limit the swinging movement of arms 108 in a downward direction.

Bumper crossbar 26 includes a horizontal portion 116 and two upwardly extending angles portions 118 at its opposite ends. Rigidly fixed to the outer end of each angled portion 118 is a wing-engaging device 120 (FIG. 11) which includes an outwardly presented bumper plate 122 and an upwardly presented retaining slot 124 having a long sidewall 126 and a short sidewall 128. The upper end of short sidewall 128 coincides with the upper end of bumper plate 122. Bumper plate 122 is adapted to receive the impact from one of wing members 32, 34 as the wing member swings inwardly toward the lateral sidewalls of main frame 12. After this initial banging contact has taken place the wing members are adapted to be lifted slightly so that they swing upwardly and over short sidewall 128 and rest within retaining slot 124.

When foldable soil conditioner 10 is in operation for conditioning the soil it is in the position shown in FIGS. 1, 4 and 6. Wing members 32, 34 are in their unfolded positions and wing frame 14 is in its operable position wherein it holds soil-engaging members 48 in engagement with the soil. Reinforcing members 104 are substantially straight and are under tension to prevent swinging movement of the outer ends of wing members 32, 34 in a rearward direction.

When it becomes necessary to transport foldable soil conditioner 10 the operator actuates hydraulic controls (not shown) mounted on vehicle 18 so as to actuate cylinder 102. Actuation of cylinder 102 causes wing frame 14 to pivot about hinges 28 from its operable position to its intermediate position as shown in FIG. 3. In its intermediate position wing frame 14 holds first links 76 of linkages 70, 72 on opposite sides of levers 110 so as to embrace levers 110 therebetween. In the intermediate position of wing frame 114, the pivotal axes of wing members 32, 34 about hinges 46 are vertically disposed. The next step in folding foldable soil conditioner 10 is to actuate hydraulic cylinder 74 by means of remote controls (not shown) on tractor 18. Actuation of hydraulic cylinder 74 causes it to contract thereby swinging first links 76 toward one another. This movement of first links 76 causes two things to happen simultaneously. First, wing members 32, 34 begin swinging inwardly toward the lateral sides of main frame 12. At the same time, the movement of first links 76 toward one another causes levers 110 to be pinched toward one another as well. This movement of levers 110 causes arms 108 to be lifted upwardly thereby causing reinforcing members 114 to be folded upwardly and inwardly by the outer ends of arms 108. Because wing arms 32, 34 are swinging inwardly toward the lateral sides of main frame 12, a slack is developed in reinforcing members 104, but this slack is taken up by the upward swinging movement of arms 108. Chains 113 at the outer ends of arms 108 permit the outer ends of arms 108 to be slightly above reinforcing members 104 as they pull reinforcing members 104 upwardly and inwardly. This relative position of arms 108 and reinforcing members 104 permits reinforcing members 104 to swing inwardly under angle portions 118 of bumper crossbar 26, but at the same time prevents reinforcing members 104 from dragging on the ground or becoming entangled in any other part of the foldable soil conditioner 10. Wing members 32, 34 continue their swinging movement in toward the lateral sides of main frame 12 until they strike against bumper plates 122 as is illustrated by phantom lines in FIG. 11. Once members 32, 34 are in their folded position the operator again actuates hydraulic cylinder 102 so as to lift wing members 32, 34 a short distance upwardly, thereby permitting them to swing up over short sidewall 128 and into retaining slots 124. Thus foldable soil conditioner 10 has been completely folded and is ready for transporting without requiring the vehicle operator to dismount from vehicle 18.

In order to unfold soil conditioner 10, the operator merely actuates hydraulic cylinder 102 to lift wing members 32, 34 out of retaining slot 124. Hydraulic cylinder 68 is then actuated to cause wing members 32, 34 to swing from their folded position (FIG. 2) to their extended position (FIG. 3). When wing arms 32, 34 are in their folded position, first links 76 are angled inwardly toward one another and force levers 110 to be angled inwardly toward one another also. When wing members 32, 34 are in their extended position, links 76 are angled outwardly and permit the weight of arms 108 to swing levers 110 upwardly to their vertically disposed positions. After moving wing members 32, 34 to their extended positions, the operator again actuates hydraulic cylinder 102 to cause wing frame 14 to be moved from its intermediate position to its operable position. At this point the soil conditioner 10 is ready for operation in the field. Reinforcing members 104 have again been unfolded and are in a substantially straight position, and ground-engaging members 48 are again in contact with the soil so as to operate thereon.

Thus from the foregoing it can be seen that my device will accomplish at least all of its stated objectives.

I claim:

1. A foldable soil conditioner, comprising:
a main frame having a forward end, a rearward end and two opposite sides;
said main frame being normally horizontally disposed;
an elongated wing frame hinged to said main frame adjacent said rearward end; said wing frame including a central member, a wing member hinged to each side of said central member, and soil-conditioning members secured to said central member and said wing members, said wing frame being normally substantially horizontally disposed in its operating position,
first power means on said main frame operatively connected to said wing frame to pivot said wing frame about ground support means on said wing frame from its horizontal operating position to a substantially vertical intermediate position, and the improvement comprising
second power means connected by linkage means from said central member to said wing members to pivot said wing members forwardly and inwardly with respect to said main frame from said intermediate position to assume a transport position.

2. A foldable soil conditioner according to claim 1 wherein elongated flexible reinforcing members extend rearwardly and outwardly from the forward end of said main frame to the outer ends of said wing members; arm members being pivotally secured to said main frame and having their outer ends secured to said reinforcing members intermediate the ends thereof, and means for lifting said arms to raise said reinforcing members when said wing members are folded forwardly and inwardly by said second power means.

3. A foldable soil conditioner according to claim 1 wherein said first power means includes a linkage and a hydraulic cylinder, said linkage pivotally interconnecting said wing frame and said main frame, said hydraulic cylinder being connected to said linkage and being adapted to be actuated so as to cause said linkage to move and swing said wing frame between said operating and intermediate positions.

4. A foldable soil conditioner according to claim 2 wherein said linkage includes a first link pivotally connected to said main frame and at least one second link pivotally connected to said wing frame, said first and second links being pivotally connected to each other.

5. A foldable soil conditioner according to claim 1 wherein said second power means includes a linkage and a hydraulic cylinder; said linkage including two pairs of links, each of said pairs including a first link pivotally connected to said central member and a second link pivotally connected to one of said wing members, said first and second links of each of said pairs being pivotally connected to each other.

6. A foldable soil conditioner according to claim 5 wherein said hydraulic cylinder is pivotally connected at one of its ends to one of said pairs and pivotally connected at the other of its ends to the other of said pairs.

7. A foldable soil conditioner according to claim 6 wherein said second links each include first and second extensible members, said extensible members being elongated and being movably interconnected for longitudinal sliding movement with respect to one another; means being provided on said extensible members for limiting their longitudinal sliding movement with respect to one another, whereupon said extensible members permit limited swinging movement of said wing members with respect to said central member.

8. A foldable soil conditioner according to claim 7 wherein each one of said extensible members includes a sleeve slidably fitted on the other of said extensible members, said means for limiting sliding movement being a stop member on one end of each of said extensible members.

9. A foldable soil conditioner according to claim 1 wherein each one of said wing members is connected to an elongated reinforcing member, said reinforcing member extending forwardly from said wing member and being connected to said main frame, said reinforcing member being foldable along at least a portion of its length; takeup means movably mounted on said main frame and connected to each of said reinforcing members, said takeup means being movable from a release position wherein it permits said support members to assume a straight configuration to a takeup position wherein it causes said reinforcing members to fold at said folding portions.

10. A foldable soil conditioner according to claim 9 wherein said second power means engages said takeup means when said wing frame is in its intermediate position so that actuation of said second power means causes said wing members to swing inwardly with respect to said main frame and simultaneously causes said takeup means to move from its release position to its takeup position.

11. A foldable soil conditioner according to claim 10 wherein said takeup means includes a pair of arms hinged to said main frame and each having an outer end adapted to swing inwardly and outwardly from said sides of said main frame; connecting means being provided on said outer ends for connecting said outer ends to said reinforcing members; said takeup means including swing means connected to said arms for causing said outer ends to swing laterally inwardly towards said frame; said swing means being drivingly engaged by said second power means when said wing frame is in its intermediate position.

12. A foldable soil conditioner according to claim 11 wherein said connecting means is a chain.

13. A foldable soil conditioner according to claim 11 wherein said swing means includes two levers each hinged at one of its ends to said main frame and two connecting members interconnecting said levers with said arms so that swinging movement of said levers causes swinging movement of said arms.

14. A foldable soil conditioner according to claim 13 wherein said second power means includes two pairs of links and a hydraulic cylinder interconnecting said pairs of links; portions of each of said pairs of links drivingly engaging one of said levers when said frame is in its intermediate position so as to respond to actuation of said hydraulic cylinder and cause said levers to swing with respect to said main frame.

15. A foldable soil conditioner according to claim 13 wherein said second power means includes two spaced-apart first links each hinged at one of its ends to said central member of said wing frame; a hydraulic cylinder interconnecting said first links and being adapted to swing them toward and away from one another; said levers being slidingly embraced between said first links when said wing frame is in its intermediate position.

16. A foldable soil conditioner according to claim 13 wherein said levers are upwardly presented and said arms are hinged about approximately horizontal axes; stops being provided on said main frame for engaging said levers so as to limit the swinging movement of said levers beyond a predetermined point.

16. A foldable soil conditioner according to claim 1 wherein said main frame includes a pair of wing-engaging devices mounted on said opposite sides of said main frame for engaging said wing members when said wing frame is in its transport position; said wing-engaging devices each including a bumper plate adapted to engage one of said wing members and limit its swinging movement towards said sides of said main frame; each of said wing-engaging devices also including a holding bracket for retentively engaging said wing members so as to hold them detachably against said sides of said main frame.

18. A foldable soil conditioner, comprising:
a main frame having a forward end, a rearward end and two opposite sides;
said main frame being normally horizontally disposed;
an elongated wing frame hinged to said main frame adjacent said rearward end; said wing frame including a central member, a wing member hinged to each side of said central member, and soil-conditioning members secured to said central member and said wing members, said wing frame being normally substantially horizontally disposed in its operating position, the improvement comprising
elongated link means interconnecting said central member and said wing members, power means connected to said link means to pivot said wing members forwardly and inwardly with respect to said main frame from said intermediate position to assume a transport position, and
means pivotally securing opposite ends of said link means to said central member and said wing member.

19. A foldable soil conditioner according to claim 18 wherein said link means are coupled together.

20. A foldable soil conditioner, comprising:
a main frame having a forward end, a rearward end and two opposite sides;
said main frame being normally horizontally disposed;
an elongated wing frame hinged to said main frame adjacent said rearward end; said wing frame including a central member, a wing member hinged to each side of said central member, and soil-conditioning members secured to said central member and said wing members, said wing frame being normally substantially horizontally disposed in its operating position,
elongated flexible reinforcing members extending rearwardly and outwardly from said forward end of said main frame to the outer ends of said wing members; the improvement comprising
arm members pivotally secured to said main frame and having their outer ends secured to said reinforcing members intermediate the ends thereof; and
means for lifting said arms to raise said reinforcing members.

* * * * *